United States Patent [19]

Lindroth et al.

[11] 4,021,389

[45] May 3, 1977

[54] THICKENING AGENT CONTAINING HETEROPOLYSACCHARIDE S-10

[75] Inventors: Thomas A. Lindroth, La Mesa; Nicholas J. Iammarino, San Diego, both of Calif.

[73] Assignee: Merck & Co., Inc., Rahway, N.J.

[22] Filed: Oct. 20, 1975

[21] Appl. No.: 624,075

[52] U.S. Cl. .......................................... 260/17.4 ST
[51] Int. Cl.² ............................................ C08L 5/00
[58] Field of Search ........................... 260/17.4 ST

[56] References Cited
UNITED STATES PATENTS

| | | | |
|---|---|---|---|
| 3,438,915 | 4/1969 | Girard | 260/17.4 |
| 3,447,940 | 6/1969 | Halleck | 260/17.4 |
| 3,481,889 | 12/1969 | Gibsen | 260/17.4 |
| 3,779,970 | 12/1973 | Evani et al. | 260/29.6 |
| 3,894,976 | 7/1975 | Kang et al. | 260/17.4 |
| 3,933,788 | 1/1976 | Kang et al. | 260/209 R |

*Primary Examiner*—Edward M. Woodberry
*Attorney, Agent, or Firm*—Donald J. Perrella; J. Jerome Behan

[57] ABSTRACT

Thickened latex coatings with improved properties are obtained by adding to 100 gallons (379 liters) of paint from 1 to 8 lbs. (0.45 to 3.6 kg) of a composition comprising Heteropolysaccharide S-10 and a copolymer of an alkenyl aromatic monomer and an unsaturated acid anhydride.

7 Claims, No Drawings

THICKENING AGENT CONTAINING HETEROPOLYSACCHARIDE S-10

BACKGROUND OF THE INVENTION

This invention relates broadly to aqueous coating compositions which are commonly referred to as latex coatings or latex paints and which contain emulsions or dispersions of water insoluble vinyl addition polymers as the principal film-forming components. Although a great variety of polymeric materials, natural and synthetic, are taught by the art to be useful additives, only a few of these materials have met with commercial success. The art is still searching for improved latex coatings which will have requisite thickness, stability, good flow and levelling properties, sag resistance, and lessened susceptibility to latex shock, and pigment shock.

OBJECTS OF THE INVENTION

It is an object of the present invention to provide latex coatings having improved properties. Another object is to provide compositions which impart improved properties to latex coatings. These and other objects of the present invention will be apparent from the following description.

SUMMARY OF THE INVENTION

Thickened latex coatings with improved properties are obtained by adding to 100 gallons (379 liters) of paint from 1 to 8 lbs. (0.45 to 3.6 kg) of a composition comprising Heteropolysaccharide S-10 and a copolymer of an alkenyl aromatic monomer and an unsaturated acid anhydride in the mole proportions of 1:1 to 2:1 respectively, wherein the copolymer has a molecular weight of at least about 30,000 and wherein about 0.5% to 10% of the acid groups are esterified with a monohydroxyl containing nonionic surfactant having a hydrophile-lipophile balance of at least about 12 and a polyoxyethylene chain with at least about 10 oxyethylene units.

Detailed Description

It has now been found that improved latex coatings are obtained by adding to the coating a novel composition of a Heteropolysaccharide and a copolymer of an alkenyl aromatic monomer and an unsaturated acid anhydride. The Heteropolysaccharide is Heteropolysaccharide S-10 which is described in U.S. patent 3,933,788 of Kenneth S. Kang, Danny D. Richey and George T. Veeder III, filed 26 June 1973 under Ser. No. 373,724 and entitled "Polysaccharide and Bacterial Fermentation Process for Its Preparation." The disclosure of this application is hereby incorporated by reference. The copolymer is a copolymer of an alkenyl aromatic monomer and an unsaturated acid anhydride in the mole proportions of 1:1 to 2:1 respectively, wherein the copolymer has a molecular weight of at least about 30,000 and wherein about 0.5% to 10% of the acid groups are esterified with a monohydroxyl containing nonionic surfactant having a hydrophile-lipophile balance of at least about 12 and a polyoxyethylene chain with at least about 10 oxyethylene units. The copolymer is more fully described in U.S. Pat. No. 3,779,970, the disclosure of which is hereby incorporated by reference.

The compositions of the present invention contain from about 20 to about 80% by weight of Heteropolysaccharide S-10 and from about 80 to about 20% by weight of the copolymer of an alkenyl aromatic monomer and an unsaturated acid anhydride. Preferably, the compositions of the present invention contain from about 40 to about 60% by weight of Heteropolysaccharide S-10 and from about 60 to about 40% by weight of the copolymer of an alkenyl aromatic monomer and an unsaturated acid anhydride.

The compositions of the present invention are added to latex coatings in an amount of from about 0.45 kg (1 lb.) to about 3.6 kg (8 lbs.) per 379 liters (100 gallons) of the latex coating. Preferably, the compositions of the present invention are added to latex coatings in an amount of from about 0.9 kg (2 lbs.) to about 2.7 kg (6 lbs.) per 379 liters (100 gallons) of the latex coating.

The compositions of the present invention may be mixed and blended and added to latex coatings as a more or less uniform mixture, or the individual components, i.e., the Heteropolysaccharide S-10 and the copolymer of an alkenyl aromatic monomer and an unsaturated acid anhydride may be added separately.

The following examples illustrate the present invention without, however, limiting the same thereto. Unless indicated otherwise all temperatures are expressed in degrees Celsius.

EXAMPLE 1

Five lots of a latex coating are prepared by grinding the following ingredients at 4500 rpm in a Cowles dissolver, Model 5VTV:

| Material | Pounds | Gallons |
|---|---|---|
| Water | 66.6 | 8.00 |
| Preservative (Dowicil 75) | 2.0 | — |
| Dispersant (Tamol 850) | 9.75 | 1.00 |
| Propylene glycol | 60.0 | 7.00 |
| Defoamer (Nopco NXZ) | 2.0 | 0.25 |
| Pigment (TiO$_2$ R-900) | 270.0 | 8.00 |
| Surfactant (Aerosol OT) 75% aqueous solution | 2.0 | 0.50 |

After the grinding is completed, the mixture is added to 388 pounds, 42.17 gallons of latex (Geon 450X20) and the following ingredients added with low speed agitation:

| Material | Pounds | Gallons |
|---|---|---|
| Coalescing agent (Texanol) | 10.1 | 1.28 |
| Propylene glycol | 20.0 | 2.33 |
| Defoamer (Nopco NXZ) | 3.0 | 0.39 |
| Thickener solution+ | 254.6 | 30.08 |

+The thickener solution is prepared by adding 4 pounds of thickener to 30.08 gallons of water.

The total materials weigh 1088.05 pounds and occupy a volume of 101.00 gallons. For the respective lots, the thickener is Heteropolysaccharide S-10 alone, a copolymer of an alkenyl aromatic monomer and an unsaturated acid anhydride alone, and various ratios of the compositions of the present invention. After 48 hours viscosity readings are taken with a Brookfield viscometer at shear rates of 6, 12, 30 and 60 rpm. The results are summarized in the following table.

| Lot | Additive | | Viscosity | | | |
|---|---|---|---|---|---|---|
| | | | 6 | 12 | 30 | 60 |
| 1 | Heteropolysaccharide S-10 | | 8200 | 5200 | 2820 | 1800 |
| 2 | Copolymer (Dow XD7846.01) | | 10500 | 9200 | 7100 | 5700 |
| | Heteropoly-saccharide S-10 | Copolymer (Dow XD7846.01) | | | | |
| 3 | 3 lbs | 1 lb | 16500 | 10600 | 5500 | 3500 |
| 4 | 2 lbs | 2 lbs | 20500 | 12800 | 6500 | 4050 |
| 5 | 1 lb | 3 lbs | 18800 | 12600 | 7000 | 4350 |

EXAMPLE 2

A latex coating is formulated from the following ingredients:

| | Material | Pounds | Gallons |
|---|---|---|---|
| 1 | Water | 50.0 | 6.00 |
| 2 | Tetrapotassium polyphosphate | 1.8 | 0.10 |
| 3 | Preservative (Dowicil 75) | 2.0 | 0.20 |
| 4 | Dispersant (Tamol 850, 30%) | 5.5 | 0.70 |
| 5 | Defoamer (Drew L 455A) | 1.0 | 0.10 |
| 6 | Flow and levelling agent (Troykyd 999) | 1.0 | 0.10 |
| 7 | Heteropolysaccharide S-10 + Copolymer (Dow XD7846.01), 50:50 ratio | 1.2 | 0.15 |
| 8 | Ethylene glycol | 9.3 | 1.00 |
| 9 | Pigment (Tipure R-900) | 250.0 | 7.40 |
| 10 | Propylene glycol | 127.0 | 14.60 |
| 11 | Ethylene glycol | 22.0 | 2.40 |
| 12 | Water | 138.0 | 16.50 |
| 13 | Carbitol Acetate | 18.2 | 2.20 |
| 14 | Surfactant (Aerosol OT, 75% aqueous solution) | 1.8 | 0.20 |
| 15 | Defoamer (Drew L 455A) | 1.0 | 0.10 |
| 16 | Flow and levelling agent (Troykyd 999) | 1.0 | 0.10 |
| 17 | Ammonium hydroxide (28%) | 2.7 | 0.30 |
| 18 | Latex (Lanflex 786) | 495.0 | 54.50 |
| | | 1127.5 | 106.55 |

Materials 1–6 are charged to a high speed dispenser in order of listing with low speed agitation. The Heteropolysaccharide S-10, and XD7846.01 copolymer, are premixed with ethylene glycol and added slowly with high speed agitation until the Heteropolysaccharide S-10 and the copolymer are in solution. Pigment is then added and grinding of the entire mixture at high speed is continued for about 30 minutes or until a 7 Hegman grind is obtained, while maintaining the temperature below 54° (130° F). The grind paste at a temperature which is not above about 43° (110° F) is then added to a tank containing the latex and the balance of the materials are added in order of listing. The contents of the tank are mixed well. The resulting coating has excellent flow and levelling properties, good sag resistance, good package stability and good resistance to latex shock, good color acceptance, reduction of synersis, and good resistance to pigment shock.

EXAMPLE 3

A latex coating is formulated from the following ingredients:

| | Material | Pounds | Gallons |
|---|---|---|---|
| 1 | Water | 66.6 | 8.00 |
| 2 | Defoamer (Nopco NXZ) | 1.0 | 0.25 |
| 3 | Surfactant (Aerosol OT, 75% aqueous solution) | 2.0 | 0.50 |
| 4 | Dispersant (Tamol 850, 30%) | 14.2 | 1.42 |
| 5 | Propylene glycol | 60.0 | 7.00 |
| 6 | Pigment (Tipure R902) | 250.0 | 7.42 |
| 7 | Inhibitive Pigment (ZnO) | 25.0 | 0.53 |
| 8 | Silica (Amsil A-15) | 50.0 | 2.27 |
| 9 | Latex (alkyl-modified acrylic) | 479.0 | 54.31 |
| 10 | Coalescing agent (Texanol) | 10.1 | 1.28 |
| 11 | Butyl Cellosolve | 17.0 | 2.28 |
| 12 | Preservative (SUPER-AD-IT) | 1.0 | 0.13 |
| 13 | Thickener solution+ | 131.1 | 15.61 |
| | | 1107.0 | 101.00 |

+3 pounds of Heteropolysaccharided S-10 and 4 pounds of copolymer (Dow XD7846.01) are put into solution in 15.61 gallons of water.

Materials 1–8 are charged to a high speed dispenser in order of listing with low speed agitation. After all ingredients are added, grinding at high speed is carried out for about 30 minutes or until a 7 Hegman grind is obtained, while maintaining the temperature below 54° (130° F). The grind paste at a temperature not above 43° (110° F) is then added to a tank containing the latex and the balance of the materials are added in order of listing. The contents of the tank are mixed well. The resulting coating has excellent flow and levelling properties, good sag resistance, good package stability and good resistance to latex shock, good color acceptance, reduction of synersis, and good resistance to pigment shock.

EXAMPLE 4

A latex coating is formulated from the following ingredients:

| | Material | Pounds | Gallons |
|---|---|---|---|
| 1 | Water | 200.00 | 27.07 |
| 2 | Preservative (Dowicil 75) | 1.50 | 0.12 |
| 3 | Dispersant (Tamol 731, 25%) | 9.00 | 1.00 |
| 4 | Ethylene glycol | 50.00 | 5.40 |
| 5 | Butyl carbitol | 15.00 | 1.89 |
| 6 | Surfactant (Triton N-57) | 2.00 | 0.23 |
| 7 | Defoamer (Foamaster G) | 1.74 | 0.23 |
| 8 | Pigment (Tipure R-900) | 215.50 | 6.26 |
| 9 | Extender (Hydrite clay) | 24.50 | 1.13 |
| 10 | Thickener+ | 4.50 | 0.39 |
| 11 | Water | 8.33 | 1.00 |
| 12 | Ammonium hydroxide (28%) | 3.00 | 0.40 |
| 13 | Water | 20.24 | 2.43 |
| 14 | Latex (Wallpol 40-136) | 367.50 | 40.83 |
| 15 | Water | 115.99 | 13.96 |
| 16 | Defoamer (Foamaster G) | 5.00 | 0.66 |
| | | 1043.80 | 100.00 |

+3 pounds of Heteropolysaccharide S-10 and 1.5 pounds of copolymer (Dow XD7846.01)

Materials 1–11 are charged to a high speed dispenser in order of listing with low speed agitation. After the ingredients are added, grinding at high speed is carried out for about 30 minutes or until a 7 Hegman grind is obtained, while maintaining the temperature below 54° (130° F). The remaining ingredients are then added in order of listing and mixed at low speed until the composition is uniform. The resulting coating has excellent flow and levelling properties, good sag resistance, good package stability and good resistance to latex shock, good color acceptance, reduction of synersis, and good resistance to pigment shock.

What is claimed is:

1. A composition comprising from about 20 percent to about 80 percent by weight of Heteropolysaccharide S-10 and from about 80 percent to about 20 percent by weight of a copolymer of an alkenyl aromatic monomer and an unsaturated acid anhydride in the mole proportions of 1:1 to 2:1 respectively, wherein the copolymer has a molecular weight of at least about 30,000 and wherein about 0.5% to 10% of the acid groups are esterified with a monohydroxyl containing nonionic surfactant having a hydrophile-lipophile balance of at least about 12 and a polyoxyethylene chain with at least about 10 oxyethylene units, the Heteropolysaccharide S-10 containing about 3% by weight of protein and about 97% by weight carbohydrate, the carbohydrate portion of which contains about 19% by weight of a uronic acid, about 39% by weight of glucose, about 29% by weight of galactose, and about 13% by weight of fucose, the heteropolysaccharide being compatible with Methylene Blue chloride dye, being substantially insoluble in dimethylsulfoxide and soluble in water, having an acetyl content of about 4.5%, and a specific rotation of $_D = +106°$ (c 0.25, H$_2$O).

2. A composition according to claim 1 containing from about 40% to about 60% by weight of Heteropolysaccharide S-10 and from about 60% to about 40% by weight of copolymer.

3. A latex coating comprising an aqueous dispersion of a water insoluble, film-forming vinyl addition polymeric latex emulsion and a dispersed pigment, the latex coating containing from about 0.45 kg to about 3.6 kg of a composition according to claim 1 per about 379 liters of the latex coating.

4. A latex coating according to claim 3 containing from about 0.9 kg to about 2.7 kg of the composition per about 379 liters of the latex coating.

5. A latex coating comprising an aqueous dispersion of a water insoluble, film-forming vinyl addition polymeric latex emulsion and a dispersed pigment, the latex coating containing from about 0.45 kg to about 3.6 kg of a composition according to claim 2 per about 379 liters (100 gallons) of the latex coating.

6. A latex coating according to claim 5 containing from about 0.9 kg to about 2.7 kg of the composition per about 379 liters of the latex coating.

7. A method of improving the properties of a water insoluble, film-forming vinyl addition polymeric latex emulsion coating comprising adding to the coating from about 0.45 kg to about 3.6 kg per about 379 liters of a composition of claim 1.

* * * * *